US008825695B2

(12) United States Patent  
Studer et al.

(10) Patent No.: US 8,825,695 B2  
(45) Date of Patent: Sep. 2, 2014

(54) MAPPING DATASET ELEMENTS

(75) Inventors: Scott Studer, Georgetown, MA (US);  
Amit Weisman, Bedford, MA (US)

(73) Assignee: Ab Initio Technology LLC, Lexington, MA (US)

( * ) Notice: Subject to any disclaimer, the term of this patent is extended or adjusted under 35 U.S.C. 154(b) by 0 days.

(21) Appl. No.: 12/883,721

(22) Filed: Sep. 16, 2010

(65) Prior Publication Data

US 2011/0066602 A1     Mar. 17, 2011

Related U.S. Application Data

(60) Provisional application No. 61/243,132, filed on Sep. 16, 2009.

(51) Int. Cl.  
*G06F 17/30*     (2006.01)  
*G06F 17/22*     (2006.01)  
*G06F 17/27*     (2006.01)

(52) U.S. Cl.  
CPC .... *G06F 17/30595* (2013.01); *G06F 17/30554* (2013.01); *G06F 17/3092* (2013.01); *G06F 17/2264* (2013.01); *G06F 17/2725* (2013.01); *G06F 17/30569* (2013.01)  
USPC ............ 707/769; 707/805; 715/249; 715/748

(58) Field of Classification Search  
CPC ............ G06F 15/7867; G06F 15/3897; G06F 17/30595  
USPC ................. 707/602, 634, 690, 756, 763, 809, 707/E17.005, E17.045, E17.124, E17.125, 707/769, 760, 805; 715/249, 748, 764, 769, 715/799, FOR. 233  
See application file for complete search history.

(56) References Cited

U.S. PATENT DOCUMENTS 5,758,351 A  *   5/1998    Gibson et al. .......... 707/999.104  
5,966,072 A     10/1999   Stanfill et al.  
(Continued)

FOREIGN PATENT DOCUMENTS

EP          2221733         8/2010

OTHER PUBLICATIONS

Mark Melia and Claus Pahl—Constraint-Based Validation of Adaptive e-Learning Courseware—IEEE Transactions on Learning Technologies, vol. 2, No. 1, Jan.-Mar. 2009 (pp. 37-49).*

(Continued)

*Primary Examiner* — Anh Ly  
(74) *Attorney, Agent, or Firm* — Fish & Richardson P.C.

(57) ABSTRACT

Mapping one or more elements of an input dataset to one or more elements of an output dataset includes: receiving in an interface one or more mapped relationships between a given output and one or more inputs represented by input variables, at least one of the mapped relationships including a transformational expression executable on a data processing system, the transformational expression defining an output of a mapped relationship based on at least one input variable mapped to an element of an input dataset; receiving in the interface identification of elements of an output dataset mapped to outputs of respective mapped relationships; generating output data from the data processing system according to the transformational expression based on input data from the input dataset associated with the element of the input dataset mapped to the input variable; determining validation information in response to the generated output data based on validation criteria defining one or more characteristics of valid values associated with one or more of the identified elements of the output dataset; and presenting in the interface visual feedback based on the determined validation information.

102 Claims, 12 Drawing Sheets

(56) References Cited

U.S. PATENT DOCUMENTS

| | | | |
|---|---|---|---|
| 6,494,159 B2 | 12/2002 | Sirmalis et al. | |
| 6,708,186 B1* | 3/2004 | Claborn et al. | 707/754 |
| 6,948,154 B1 | 9/2005 | Rothermel et al. | |
| 7,080,088 B1 | 7/2006 | Lau | |
| 7,110,924 B2* | 9/2006 | Prewett et al. | 703/2 |
| 7,164,422 B1 | 1/2007 | Wholey, III et al. | |
| 7,167,850 B2 | 1/2007 | Stanfill | |
| 7,661,067 B2 | 2/2010 | Chen et al. | |
| 7,716,630 B2 | 5/2010 | Wholey et al. | |
| 7,765,529 B1 | 7/2010 | Singh et al. | |
| 7,840,949 B2 | 11/2010 | Schumacher et al. | |
| 7,853,553 B2* | 12/2010 | Lankinen et al. | 707/602 |
| 7,890,509 B1* | 2/2011 | Pearcy et al. | 707/736 |
| 7,895,586 B2* | 2/2011 | Ozone | 717/155 |
| 8,484,159 B2 | 7/2013 | Stanfill et al. | |
| 2001/0014890 A1 | 8/2001 | Liu et al. | |
| 2002/0161799 A1 | 10/2002 | Maguire et al. | |
| 2003/0016246 A1 | 1/2003 | Singh | |
| 2003/0163597 A1* | 8/2003 | Hellman et al. | 709/316 |
| 2004/0056908 A1 | 3/2004 | Bjornson et al. | |
| 2004/0239681 A1* | 12/2004 | Robotham et al. | 345/581 |
| 2005/0060313 A1 | 3/2005 | Naimat et al. | |
| 2005/0060317 A1 | 3/2005 | Lott et al. | |
| 2005/0114369 A1 | 5/2005 | Gould et al. | |
| 2005/0178833 A1* | 8/2005 | Kisliakov | 235/441 |
| 2005/0187984 A1 | 8/2005 | Chen | |
| 2005/0234762 A1 | 10/2005 | Pinto et al. | |
| 2005/0262121 A1 | 11/2005 | Cesare et al. | |
| 2006/0095466 A1 | 5/2006 | Stevens et al. | |
| 2006/0200739 A1* | 9/2006 | Bhatia et al. | 715/500 |
| 2007/0011208 A1 | 1/2007 | Smith | |
| 2007/0027858 A1 | 2/2007 | Weinberg et al. | |
| 2007/0050750 A1 | 3/2007 | Bykov et al. | |
| 2007/0094060 A1 | 4/2007 | Apps et al. | |
| 2007/0136692 A1* | 6/2007 | Seymour et al. | 707/1 |
| 2007/0198457 A1 | 8/2007 | Olenick et al. | |
| 2007/0226203 A1* | 9/2007 | Adya et al. | 707/4 |
| 2007/0239751 A1 | 10/2007 | Wei et al. | |
| 2007/0271381 A1 | 11/2007 | Wholey et al. | |
| 2007/0276787 A1* | 11/2007 | Piedmonte | 707/2 |
| 2007/0294119 A1 | 12/2007 | Eicher et al. | |
| 2008/0049022 A1 | 2/2008 | Sherb et al. | |
| 2008/0228697 A1* | 9/2008 | Adya et al. | 707/2 |
| 2008/0243772 A1* | 10/2008 | Fuxman et al. | 707/2 |
| 2008/0243891 A1* | 10/2008 | Super et al. | 707/101 |
| 2008/0256014 A1* | 10/2008 | Gould et al. | 706/48 |
| 2008/0312979 A1 | 12/2008 | Lee et al. | |
| 2008/0313204 A1* | 12/2008 | Schultz et al. | 707/101 |
| 2009/0083313 A1 | 3/2009 | Stanfill et al. | |
| 2009/0094291 A1 | 4/2009 | Yalamanchi | |
| 2009/0319494 A1* | 12/2009 | Gooder | 707/4 |
| 2009/0327196 A1* | 12/2009 | Studer et al. | 707/100 |
| 2010/0100220 A1 | 4/2010 | Belanger et al. | |
| 2010/0114833 A1 | 5/2010 | Mu | |
| 2010/0121890 A1* | 5/2010 | Perkins et al. | 707/805 |
| 2010/0138388 A1* | 6/2010 | Wakeling et al. | 707/634 |
| 2010/0145914 A1 | 6/2010 | Kanno et al. | |
| 2010/0198769 A1* | 8/2010 | Gould et al. | 706/47 |
| 2010/0223218 A1 | 9/2010 | Prendergast | |
| 2011/0061057 A1 | 3/2011 | Harris et al. | |
| 2011/0066602 A1* | 3/2011 | Studer et al. | 707/690 |
| 2011/0295863 A1 | 12/2011 | Weir et al. | |
| 2012/0054164 A1 | 3/2012 | Falkebo et al. | |
| 2012/0158625 A1 | 6/2012 | Nelke et al. | |
| 2012/0167112 A1 | 6/2012 | Harris et al. | |
| 2012/0185449 A1* | 7/2012 | Gould et al. | 707/E17.014 |

OTHER PUBLICATIONS

Guillem Rull et al.—"MVT: A Schema Mapping Validation Tool"—EDBT'09, Mar. 24-26, 2009, Saint Petersburg, Russia. Copyright 2009 ACM 978-1-60558-422-05/09/0003—(pp. 1120-1123).*

International Search Report & Written Opinion issued in PCT application No. PCT/US2011/057623, dated Jan. 25, 2012, 13 pages.

International Search Report & Written Opinion issued in PCT application No. PCT/US09/66210, mailed Jan. 27, 2010, 8 pages.

Van Megen, Rudolf et al., "Costs and benefits of early defect detection: experiences from developing client server and host applications." Software Quality Journal 4, 247-256 (1995).

International Search Report & Written Opinion issued in PCT application No. PCT/US10/49142, dated Nov. 5, 2010, 11 pages.

International Search Report & Written Opinion issued in PCT application No. PCT/US2012/021286, dated May 4, 2012, 15 pages.

Harkins, Susan "Use Excel's Conditional Formatting to Find Errors" *TechRepublic*, pp. 1-3, Feb. 16, 2008: http://www.techrepublic.com/blog/microsoft-office/use-excels-conditional-formatting-to-find-errors/.

International Search Report & Written Opinion issued in PCT application No. PCT/US2013/064979, mailed Nov. 28, 2013, 11 pages.

Liskin, Miriam "Microsoft Access 97 for Windows SuperGuide" *Ziff-Davis Press*, Jan. 1, 1997, ch. 4 & 15, pp. 117-157 and 687-739.

* cited by examiner

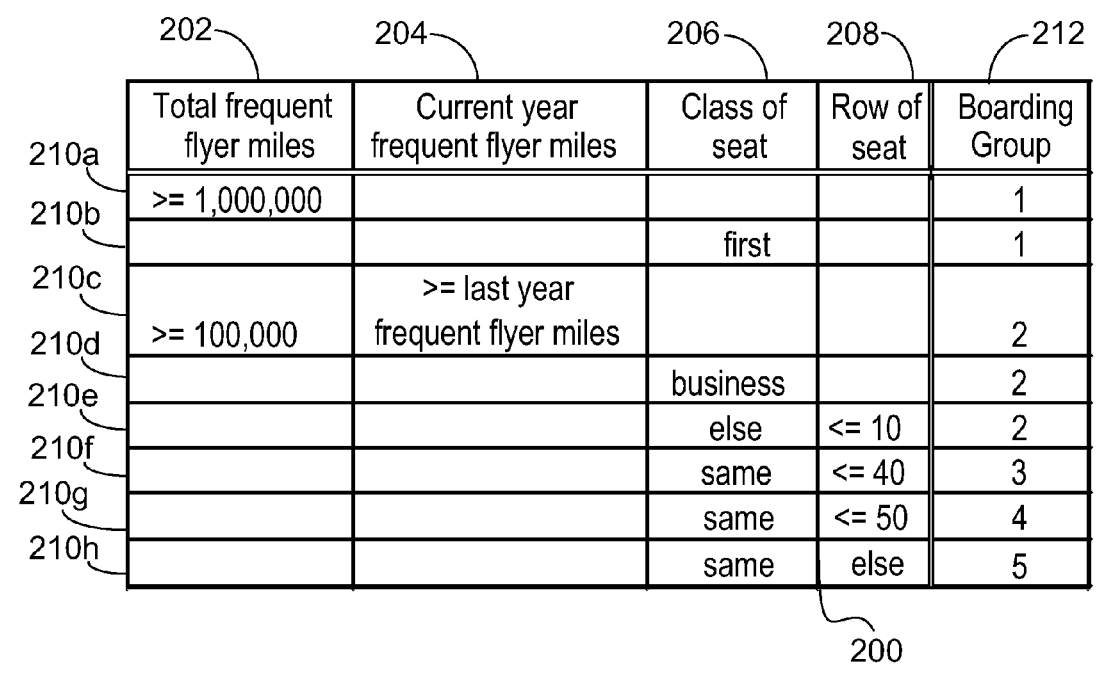

| | Total frequent flyer miles | Current year frequent flyer miles | Class of seat | Row of seat | Boarding Group |
|---|---|---|---|---|---|
| 210a | >= 1,000,000 | | | | 1 |
| 210b | | | first | | 1 |
| 210c | >= 100,000 | >= last year frequent flyer miles | | | 2 |
| 210d | | | business | | 2 |
| 210e | | | else | <= 10 | 2 |
| 210f | | | same | <= 40 | 3 |
| 210g | | | same | <= 50 | 4 |
| 210h | | | same | else | 5 |

FIG. 4

| Output | Translation |
|---|---|
| Name | (!) Code Table. Target ("name", ZIP code) |

| Output | Translation | Test Data |
|---|---|---|
| Name | Code Table. Target ("name", Name) | Frank — 704 |

| Output | Transform |
|---|---|
| Age | Current Date – Birth Date |

| Output | Transform |
|---|---|
| Residency | if State = "MA"  —702b<br>"in-state"<br>else "out-of-state" —702c |

| Output | Translation | Test Data |
|---|---|---|
| Profit Per Month | Profit Per Year / 12 | 100 |
| Profit Per Month | Accounts Receivable - Expenses | 1200 |

| Output | Translation | Test Data |
|---|---|---|
| Profit Per Month | Profit Per Year / 12 —702a | 200 —708 |
| Profit Per Month | Accounts Receivable - Expenses + Investment Returns —702b | 2400 |
FIG. 7F
FIG. 7G
FIG. 7H

| | Output Name | Expression / Rule | Computed Value |
|---|---|---|---|
| 1 | Line1 Wages | Line1 Wages | 59000.85 |
| 2 | Line4 AGI | Line1 Wages + Line2 Taxable Interest + Line3 Unemployme | ☆60301.63 |
| 3 | Line5 Deductions Amount | Compute Line5 | 15050 |
| 4 | Line6 Taxable Income | Compute Line6 Taxable Income | ☆45251.63 |
| 5 | Line7 Federal Income Tax With | Line7 Federal Income Tax Withheld | 11438.31 |
| 6 | Line12 Refund | Compute Refund or the Amount your owe | ☆6285.57 |
| 7 | Line13 Amount Owed | Compute Refund or the Amount your owe | 0.00 |
| 8 | First Name | First Name | KAYLA |
| 9 | Last Name | Last Name | GOLD |
| 10 | SSN | SSN | NULL |
| 11 | Spouse First Name | Spouse First Name | NULL |
| 12 | Spouse Last Name | Spouse Last Name | NULL |
| 13 | Spouse SSN | Spouse SSN | |
| 14 | Married and Filing Jointly | Compute Marriage Status | 1 |
| 15 | Line2 Taxable Interest | Line2 Taxable Interest | 1200.78 |
| 16 | Line3 Unemployment Compens | Line3 Unemployment Compensation | 0.00 |
| 17 | Line5 Dependent | Line5 Dependent | 1 |
| 18 | Line5 Spouse Dependent | Line5 Spouse Dependent | 0 |

FIG. 8

MAPPING DATASET ELEMENTS

CLAIM OF PRIORITY

This application claims priority to Provisional Patent Application Ser. No. 61/243,132, filed on Sep. 16, 2009, the entire contents of which are hereby incorporated by reference.

TECHNICAL FIELD

This description relates to mapping dataset elements.

BACKGROUND

In some database or data warehousing systems, elements of one dataset (a "source" or "input" dataset) are mapped to elements of another dataset (an "output" or "target" dataset). These elements may include fields of a database table or attributes of data objects, for example. The records of the input dataset (e.g., rows of a table) can then be imported into the output dataset with the appropriate input fields being mapped to the appropriate output fields. There may be differences between the format of the input dataset and the format of the output dataset that call for data values to be converted to satisfy the output format. In some cases, additional data transformations are also applied, for example, to ensure data quality or to satisfy desired characteristics of the output dataset. The mapping process may involve interaction among different users having different skill levels (e.g., novice or expert) or different areas of focus (e.g., business or technical).

SUMMARY

In one aspect, in general, a method is described for mapping one or more elements of an input dataset stored in an input data processing system to one or more elements of an output dataset stored in an output data processing system. The method includes receiving in an interface one or more mapped relationships between a given output and one or more inputs represented by input variables, at least one of the mapped relationships including a transformational expression executable on a data processing system, and the transformational expression defining an output of a mapped relationship based on at least one input variable mapped to an element of an input dataset. The method includes receiving in the interface identification of elements of an output dataset mapped to outputs of respective mapped relationships. The method includes generating output data from the data processing system according to the transformational expression based on input data from the input dataset associated with the element of the input dataset mapped to the input variable. The method includes determining validation information in response to the generated output data based on validation criteria defining one or more characteristics of valid values associated with one or more of the identified elements of the output dataset; and presenting in the interface visual feedback based on the determined validation information.

Aspects can include one or more of the following features.

The method further includes importing input data from the input dataset into the output dataset according to the mapped relationships.

Importing the input data includes applying the transformational expressions to input values in respective fields of input records of the input dataset and storing output values in respective fields of output records of the output dataset, where at least some fields of the input records correspond to the elements of the input dataset mapped to the input variables and at least some fields of the output records correspond to the elements of the output dataset mapped to outputs of respective mapped relationships.

Applying the transformational expressions to input values in respective fields of input records of the input dataset and storing output values in respective fields of output records of the output dataset includes executing a dataflow graph including nodes representing data processing components, links representing data flows between the data processing components, a node representing the input dataset providing a data flow of the input records, and a node representing the output dataset receiving a data flow of the output records.

The method further includes storing a mapping specifying the mapped relationships.

Determining the validation information includes retrieving a specification of the validation criteria stored in the output data processing system.

The interface is provided by the data processing system and is presented to a first user, and the specification of the validation criteria stored in the output data processing system is received from a second user.

The method further includes presenting in the interface a value representing the generated output data.

Determining the validation information includes evaluating output data generated for each transforming mapped relationship that includes a transformational expression, based on the validation criteria associated with the identified elements of the output dataset mapped to the outputs of the transforming mapped relationships.

The mapped relationships include multiple transforming mapped relationships that include transformational expressions.

The validation criteria include a first validation criterion associated with a first identified element of the output data set that defines one or more characteristics of valid values associated with the first identified element, and a second validation criterion associated with a second identified element of the output data set that defines one or more characteristics of valid values associated with the second identified element.

Validation information is determined in response to a generated output record that includes a first field corresponding to the first identified element and a second field corresponding to the second identified element.

The first validation criterion depends on a value in the second field of the output record.

The validation information depends on a value in the first field of the output record and a value in the second field of the output record.

The method further includes determining syntax information indicating valid structure for a transformational expression.

The method further includes presenting in the interface visual feedback based on the determined syntax information.

The method further includes accepting a modified transformational expression based on received user modifications to the transformational expression.

The method further includes generating modified output data from the data processing system according to the modified transformational expression based on the input data from the input dataset.

The method further includes determining modified validation information in response to the generated modified output data and presenting in the interface visual feedback based on the modified validation information.

Generating the modified output data and presenting the visual feedback based on the modified validation information occurs while the transformational expression is being modified.

Generating the modified output data and presenting the visual feedback based on the modified validation information occurs in response to a user request after the transformational expression has been modified.

The input data from the input dataset is received according to a link representing a flow of data to a component of a dataflow graph that applies the transformational expression, the dataflow graph including nodes representing data processing components, links representing data flows between the data processing components, a node representing the input dataset providing a data flow of the input data, and a node representing the output dataset receiving a data flow of the output data.

The generated output data stored in the output dataset is provided to the output dataset according to a link representing a flow of data from a component of a dataflow graph that applies the transformational expression, the dataflow graph including nodes representing data processing components, links representing data flows between the data processing components, a node representing the input dataset providing a data flow of the input data, and a node representing the output dataset receiving a data flow of the output data.

At least a first mapped relationship is received in response to a selection of a component of a dataflow graph that applies the first mapped relationship, the dataflow graph including nodes representing data processing components, links representing data flows between the data processing components, a node representing the input dataset providing a data flow of the input data, and a node representing the output dataset receiving a data flow of the output records.

The visual feedback includes an indicator representing validation information for one of a plurality of nodes of a lineage diagram displayed on the interface, the nodes representing transformed values that include at least one transformed value associated with the one or more identified elements of the output dataset.

The visual feedback includes a plurality of indicators each associated with a node among the plurality of nodes of the lineage diagram displayed on the interface.

At least some of the nodes associated with the indicators are connected by links representing dependencies between the transformed values represented by the nodes.

The visual feedback includes a plurality of indicators each associated with an output element among a plurality of output elements displayed on the interface that include at least one output element representing the one or more identified elements of the output dataset.

The plurality of output elements displayed on the interface correspond to fields representing results of application of transformational expressions to records of the input data.

At least one indicator indicates validation information for a row of values for the fields, the row representing output values resulting from application of transformational expressions to a single record of the input data.

At least one indicator indicates validation information for a column of values for a field, the column representing a plurality of applications of a single transformational expression to respective records of the input data.

The visual feedback includes statistics computed based on the validation information, the statistics including data representing results of application of the validation criteria to multiple records of the input data.

The statistics are calculated at regular time intervals.

The visual feedback includes a custom error message associated with the validation criteria, the custom error message indicating information about a result of a particular instance of application of the validation criteria to a record of the input data.

The method further includes receiving in the interface an output defined as at least one constant independent of the input variables.

The method further includes receiving expected values representing results of transformational expressions, and wherein determining the validation information includes comparing the expected values to output data generated for each transforming mapped relationship that includes a transformational expression.

In another aspect, in general, a system is described for mapping one or more elements of an input dataset to one or more elements of an output dataset. The system includes an input data storage system storing an input dataset; an output data storage system storing an output dataset; and a data processing system configured to provide an interface for receiving user input and presenting results of data processing. The receiving and presenting include: receiving in the interface one or more mapped relationships between a given output and one or more inputs represented by input variables, at least one of the mapped relationships including a transformational expression executable on the data processing system, the transformational expression defining an output of a mapped relationship based on at least one input variable mapped to an element of the input dataset; receiving in the interface identification of elements of the output dataset mapped to outputs of respective mapped relationships; generating output data from the data processing system according to the transformational expression based on input data from the input dataset associated with the element of the input dataset mapped to the input variable; determining validation information in response to the generated output data based on validation criteria defining one or more characteristics of valid values associated with one or more of the identified elements of the output dataset; and presenting in the interface visual feedback based on the determined validation information.

In another aspect, in general, a system is described for mapping one or more elements of an input dataset to one or more elements of an output dataset. The system includes means for storing an input dataset; means for storing an output dataset; and means for providing an interface for receiving user input and presenting results of data processing. The receiving and presenting include: receiving in the interface one or more mapped relationships between a given output and one or more inputs represented by input variables, at least one of the mapped relationships including a transformational expression executable on a data processing system, the transformational expression defining an output of a mapped relationship based on at least one input variable mapped to an element of the input dataset; receiving in the interface identification of elements of the output dataset mapped to outputs of respective mapped relationships; generating output data from the data processing system according to the transformational expression based on input data from the input dataset associated with the element of the input dataset mapped to the input variable; determining validation information in response to the generated output data based on validation criteria defining one or more characteristics of valid values associated with one or more of the identified elements of the output dataset; and presenting in the interface visual feedback based on the determined validation information.

In another aspect, in general, a computer-readable medium stores a computer program for mapping one or more elements of an input dataset to one or more elements of an output dataset. The computer program includes instructions for causing a computer to: receive in an interface one or more mapped relationships between a given output and one or more inputs represented by input variables, at least one of the mapped relationships including a transformational expression executable on a data processing system, the transformational expression defining an output of a mapped relationship based on at least one input variable mapped to an element of an input dataset; receive in the interface identification of elements of an output dataset mapped to outputs of respective mapped relationships; generate output data from the data processing system according to the transformational expression based on input data from the input dataset associated with the element of the input dataset mapped to the input variable; determine validation information in response to the generated output data based on validation criteria defining one or more characteristics of valid values associated with one or more of the identified elements of the output dataset; and present in the interface visual feedback based on the determined validation information.

Aspects can include one or more of the following advantages.

In some cases, when an input dataset is being mapped into an output dataset (e.g., when loading a data feed into a data warehouse), the input dataset may have a large number of fields (e.g., thousands of fields) and the output dataset may have a smaller number of fields (e.g., less than a hundred fields). A data management system uses a mapping that provides a specification of how information from one or more input fields map to a given output field. A user interface for the data management system is provided to enable a user to configure the mapping (during a "mapping process").

The user interface includes testing and validation features that enable relatively inexperienced users to view test values and validation information to enable the user to verify that the results of the mapping match what is intended, and to reduce errors. The validation feature enables a more experienced user to associate validation rules with elements of the output dataset in advance, which can later be applied during the mapping process. For example, one or more experienced users may have knowledge about requirements an output dataset stored in an output data storage system that is to serve as a repository for data from a large number of input data sets stored in a variety of different input data storage systems. It may be impractical for the experienced users to map fields of all of the input data sets to the appropriate fields of the output dataset. The user interface enables different novice users to provide mappings for each of the input datasets, while still providing a way for the experienced users to enforce validity criteria to catch potential errors that may be made by novice users that the experienced users would not make or to satisfy certain conventions associated with the output dataset that the novice users would not know about.

By integrating into the user interface testing and validation based on rules provided by a more experienced or more technical user, potential errors or inconsistencies introduced by a less experienced or less technical user can be caught earlier (during the mapping process) rather than later (during a system integration process). Cost savings of orders of magnitude can potentially be gained by catching these errors or inconsistencies earlier. Not only does it reduce the time needed for different teams of users to explain issues and identify problems, but it also makes it easier to fix the problems once they are identified.

Other features and advantages of the invention will become apparent from the following description, and from the claims.

DESCRIPTION OF DRAWINGS

FIG. 4 is an example of a rule entry interface.

FIGS. 7A-7H are examples of the operation of a transform view interface.

FIG. 8 is an example of a transform view interface.

DETAILED DESCRIPTION

Figure 1:
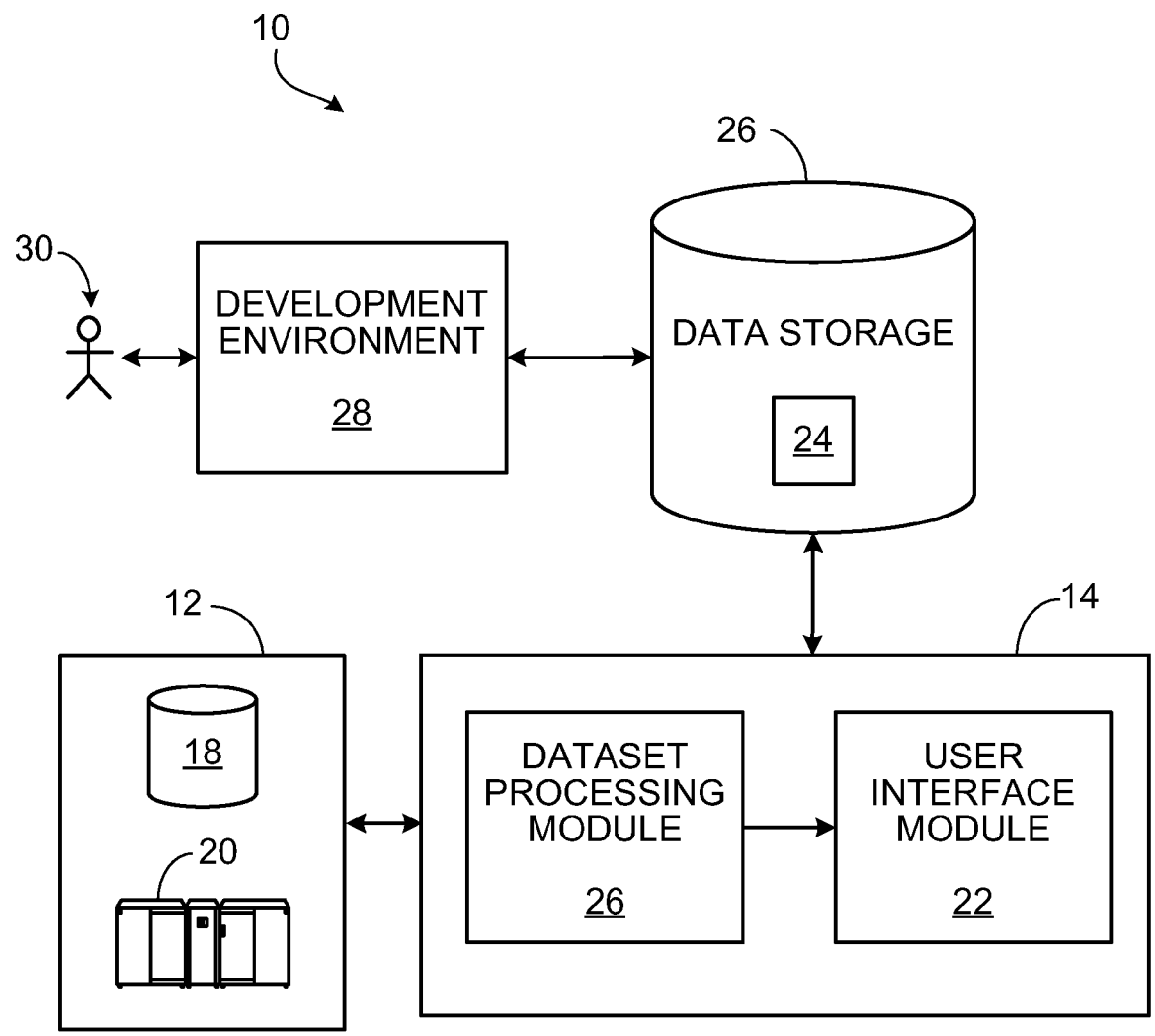
FIG. 1 is an exemplary system for mapping dataset elements.

Referring to FIG. 1, a system 10 for mapping dataset elements and processing data according to the mapped dataset elements includes a data source 12 that may include one or more sources of data such as storage devices or connections to online data streams, each of which may store data in any of a variety of storage formats (e.g., database tables, spreadsheet files, flat text files, or a native format used by a mainframe). An execution environment 14 includes a dataset mapping module 16 and a dataset processing module 22. The execution environment 14 may be hosted on one or more general-purpose computers under the control of a suitable operating system, such as the UNIX operating system. For example, the execution environment 14 can include a multiple-node parallel computing environment including a configuration of computer systems using multiple central processing units (CPUs), either local (e.g., multiprocessor systems such as SMP computers), or locally distributed (e.g., multiple processors coupled as clusters or MPPs), or remotely, or remotely distributed (e.g., multiple processors coupled via LAN or WAN networks), or any combination thereof.

The dataset mapping module 16 stores mapping information for mapping data between input and output datasets, as described in more detail below. The dataset processing module 22 reads data from an input dataset stored in the data source 12 and processes the data according to the stored mapping information, for example, based on mapping information 24 stored in a data storage system 26 that includes transformational expressions to be applied to the data. Storage devices providing the data source 12 may be local to the execution environment 14, for example, being stored on a storage medium connected to a computer running the execution environment 14 (e.g., hard drive 18), or may be remote to the execution environment 14, for example, being hosted on a remote system (e.g., mainframe 20) in communication with a computer running the execution environment 14 over a local or wide area data network.

The dataset mapping module 16 displays to a user (e.g., over a user inter interface shown on a display) visual representations based on the data being mapped. The data storage system 26 is also accessible to a development environment 28 in which a developer 30 is able to develop programs, stored in the data storage system 26, that are used by the data processing module 22 to process and display the data. The development environment 28 is, in some implementations, a system for developing applications as dataflow graphs that include vertices (components or datasets) connected by directed links (representing flows of work elements) between the vertices. For example, such an environment is described in more detail in U.S. Publication No. 2007/0011668, entitled "Managing Parameters for Graph-Based Applications," incorporated herein by reference.

The dataset processing module 22 can process data from a variety of types of systems including different forms of database systems. The data may be organized as records having values for respective fields (also called "attributes" or "columns"), including possibly null values. When first reading data from a data source, the dataset processing module 22 typically starts with some initial format information about records in that data source. (Note that in some circumstances, even the record structure of the data source may not be known initially and may instead be determined after analysis of the data source). The initial information about records can include the number of bits that represent a distinct value, the order of fields within a record, and the type of value (e.g., string, signed/unsigned integer) represented by the bits. As the dataset processing module 22 reads records from a data source, it applies transformational expressions to produce intermediate data and output data. The dataset mapping module 16 is able to accesses this data and displays representations of the data to a user in the user interface of the dataset mapping module 16.

Figure 2:
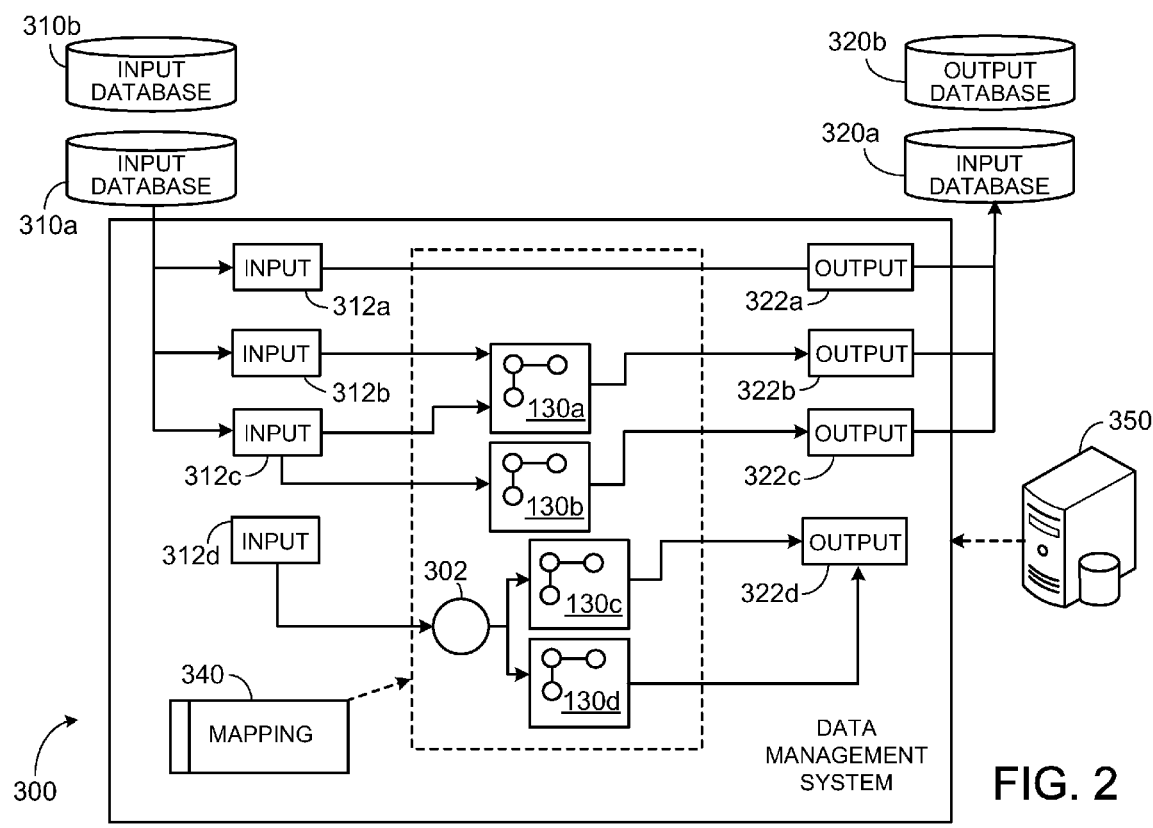
FIG. 2 is an example of a data management system.

FIG. 2 shows an exemplary data management system 300 for mapping elements of one dataset to elements of another dataset that can be implemented using the system 10. In this example, the system 300 includes one or more input datasets 310a, 310b stored in an input data storage system, where an individual input dataset (e.g., a database table) can have multiple individual elements that can serve as inputs to the system 300. Input dataset 310a has inputs 312a, 312b, 312c, 312d (e.g., fields or columns of the database table). Further, the data management system 300 also has one or more output datasets 320a, 320b stored in an output data storage system (which may be the same as the input data storage system), where an individual output dataset (e.g., a database table) can have multiple individual elements that can serve as outputs of the system 300. Output dataset 320a has outputs 322a, 322b, 322c, 322d (e.g., fields or columns of the database table). The data management system 300 has a mapping 340 that indicates mapped relationships between inputs 312 and outputs 322 and optionally transforms specified values or characteristics associated with the element being mapped from an input to an output. The data management system 300 includes a data processing system (e.g., a dataflow graph executed by the dataset processing module 22) for executing transformations defined by the mapping and interacting with the user through a user interface, and may operate in conjunction with a database server 350 or other computing system. In some implementations, the data processing system of the data management system 300 uses the mapping 340 to import data from the input dataset 310a into the output dataset 320a and apply transformations to the data (e.g., individual records) being imported from the input dataset 310a into the output dataset 320a. In some implementations, the data processing system of the data management system 300 uses the mapping 340 to help a user design a transformation that will be applied to data at a later time and/or using a different data processing system for importing the data.

In these figures, a closed-headed arrow with a solid line indicates the flow of data, while an open-headed arrow with a dashed line indicates another kind of association as specified in the description of the figure.

Some inputs may map directly to some outputs. For example, the data management system 300 passes an input 312a directly to an output 322a without transforming it. The input 312a may correspond to a field called "Last Name" and the output 322a may correspond to a field called "LName," and since both fields are intended to store the same data logical data values in the same format no transformation of the data values will be needed when the records of the input dataset 310a are imported into the output dataset 320a. Some inputs may map to an output, and the data management system 300 may transform data associated with the input. For example, the element being mapped by the data management system 300 by way of the input 312c may be transformed by performing a computation or applying an expression to change the data values associated with that element or characteristics associated with that element (e.g., data values within a given field of records in the input dataset 310a are transformed as those records are being imported into the output dataset 320a). The transformation may include transforming the data type while keeping the data value the same, or may include transforming the data value to change a characteristic such as unit of measure or capitalization, for example. Some inputs may map to an output, and the data management system 300 may transform the input in a variable fashion that depends on predetermined criteria. For example, some of the data associated with the element being mapped by the data management system 300 by way of the input 312d may have one transformation applied based on given criteria, and other data associated with the element being mapped by the data management system 300 by way of the same input 312d may have a different transformation applied based on the given criteria. The criteria for determining which transformation is to be applied to the data can be determined by computational logic 302 in the data management system 300, for example. The computational logic 302 can be provided, for example, by a user entering an expression or defining a rule in a user interface, as described in more detail below. Further, in these examples, a transformation may operate on the data from more than one input to generate the data mapped to a single output, such as data from input 312b and 312c being used to generate data mapped to output 322b. For example, the output 322b may correspond to a field whose value is a function of the values of fields corresponding to the inputs 312b and 312c. So, a mapped relationship between a given output and one or more inputs can include a identification of a single input or specification of a transformation applied to one or more identified inputs. A transformation used in mapping one or more inputs to an output may take the form of a data structure defining an expression to be applied or computation to be performed called a transform that can be used in a variety of data processing contexts, as described in more detail below. The mapping 340 in the data management system 300 is implemented using a set of transforms 130a, 130b, 130c, 130d.

Figure 3A:
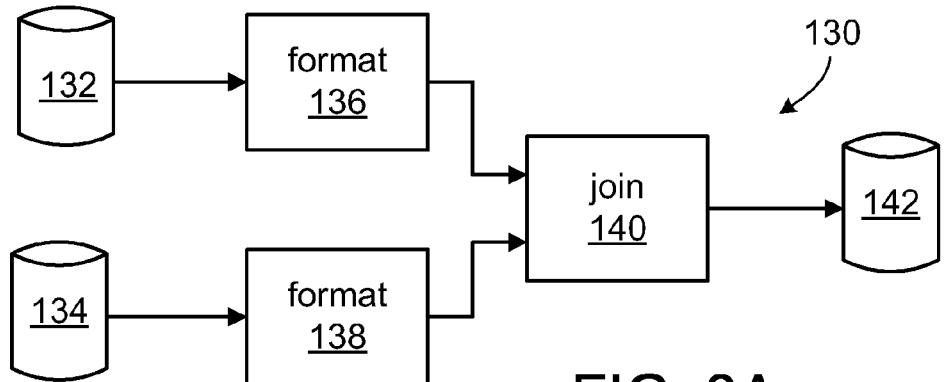
FIG. 3A is an example of a data processing graph.

A transform defines operations performed on one or more inputs to generate one or more possible outputs. In some implementations, the transform is initially stored as a data structure with a predetermined format and is later compiled into an executable form. Transforms may be used in the context of graph-based computations such as a dataflow graph having data processing components connected by linking elements representing data flows. For example, the simple dataflow graph 130 of FIG. 3A takes as input two data sets 132, 134 (for example, frequent flier data and flight reservation data), formats the data in each set in separate format components 136, 138 so they can be used together, and joins them in join component 140 to produce an output data set 142. A transform may itself be implemented by a graph-based computation, such as that in the graph 130, or may be implemented within a component of a graph, such as the individual components 136, 138, and 140 of which the graph 130 is composed.

Figure 3B:
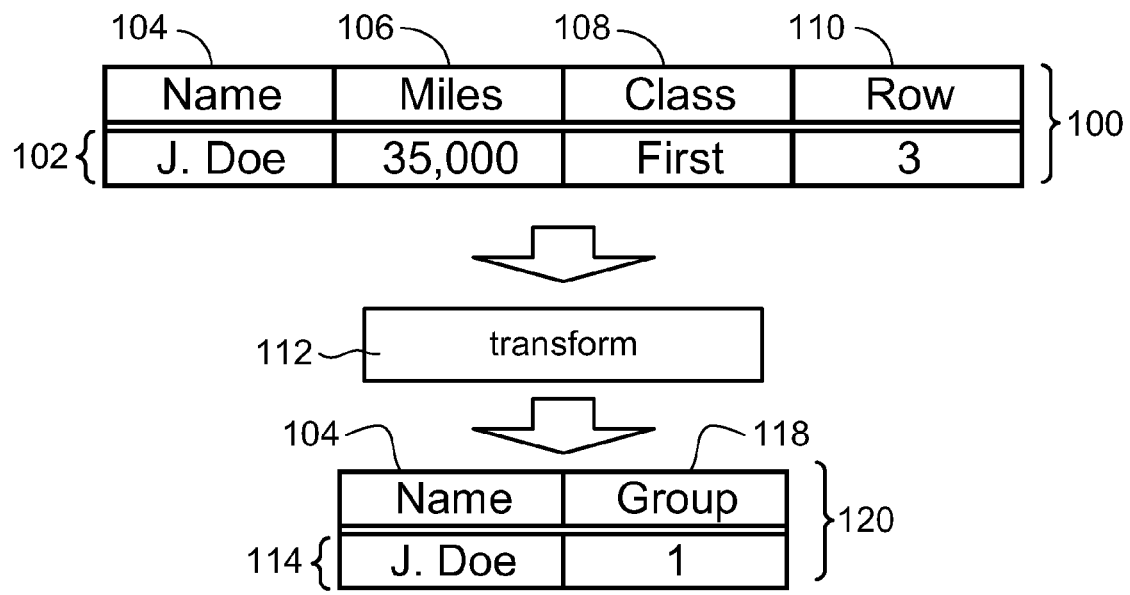
FIG. 3B is an example of a transform.

Transforms can also be implemented using data processing constructs called "business rules." A business rule can be expressed as a set of criteria that can be used, for example, for converting data from one format to another, making determinations about data, or generating new data based on a set of input data. For example, in FIG. 3B, a record 102 in a flight reservation system indicates the name 104 of a passenger, how many miles 106 he has flown this year, the class 108 of his ticket, and the row 110 he is seated in. A business rule indicates that such a passenger should be put in boarding group 1. A business rule is generally easy for a human to understand, i.e., "first class passengers are in group 1," but may need to be translated into something a computer can understand before it can be used to manipulate data. A business rule can be implemented using a transform 112 that receives input records, such as record 102, from one or more data sources, e.g., input dataset 100, and inserts an output record, e.g., record 114, indicating the passenger's name 104 and which group he is in 118 into an output dataset 120. Input and output datasets may also be referred to as data streams.

To simplify creation and manipulation of transforms that implement business rules for non-technical users, a tool is provided for such users to handle a set of one or more business rules, referred to as a rule set, in a format with which they are familiar, that tells the computer system what they want the transform to do. A rule set is the set of rules that produce a single transform. A rule may be composed of one or more rule cases that compute different values for the rule's output depending on the input. A rule may also include other rules. Some rules in a rule set may produce values for additional or alternative outputs. A rule set may contain other rule sets, which we refer to as "included" rule sets.

FIG. 4 shows a business rule editor 200, which is an example of a user interface for specifying properties of a business rule. The business rule editor 200 can be a component of a user interface for mapping elements of an input dataset to elements of an output dataset and generating a corresponding mapping 340 used in the data management system 300. The inputs of the business rule are listed on the left and the outputs of the business rule are listed on the right. Trigger columns 202, 204, 206, 208 in the business rule editor 200 correspond to available data values, and rows 210a-h correspond to rule cases, i.e., sets of criteria that relate the available data values. A rule case applies to a given record (e.g., 102 in FIG. 1A) if the data values of that record, for each trigger column in which the rule case has criteria, meets the triggering criteria. If a rule case applies, output is generated based on one or more output columns 212. A rule case that has all of its input relationships satisfied may be referred to as "triggered." Each output column 212 corresponds to a potential output variable, and the value in the corresponding cell of the applicable row 210a-h determines the output, if any, for that variable. The cell could contain a value that is assigned to the variable or it could contain an expression that must be evaluated to generate the output value, as discussed below. There may be more than one output column, though only one is shown in FIG. 4

With regard to editing business rules, output variables have "default values", which are expressions, including expressions that are simply the name of an input variable. Output variables can also be computed by rules that represent more complex logic. When a user edits business rules, the user can view output variables, and establish a mapping by dragging input variables from a sidebar onto the default value cells corresponding to output variables. A user can also directly edit the default value expression for an output variable. Further, when more advanced logic is needed to calculate a specific output, a user can create one or more rules to calculate that output.

When editing business rules, a user may assign default values in the output variables grid containing technical information about output variables. For example, a user can create rules for outputs from a main form showing rule sets. In some implementations of a user interface for generating a mapping 340, when a user creates a rule, the user might see the default value, and when the user assigns the default values, the corresponding rules might be available.

Because business rules can be created and manipulated by non-technical users, a group of users may vary in their ability to create and manipulate rules that will function as intended. Some users may have a rudimentary or incomplete understanding of how to create and manipulate business rules, while other users may be technically proficient and fully understand all aspects of creating and manipulating business rules. Also, some users may have knowledge of the underlying meaning of a business rule, e.g. its real-world application, while other users may not have any knowledge of how the business rule is applied in use. For example, a user with limited or no knowledge of income tax may not fully understand the purpose of a business rule that is used to process an income tax return. A user's knowledge of the real-world application of a business rule can be independent of the user's technical knowledge about business rules. For example, a user with high technical knowledge but low application knowledge could create a business rule, and then a user with high application knowledge could review the business rule to confirm it will achieve an intended purpose when the business rule is put into use. In this example, the user with high technical knowledge could be considered a novice user with respect to business rule application, while the user with high application knowledge could be considered an experienced user with respect to business rule application. In other examples, a technically proficient user could review business rules created by a user with limited technical knowledge to determine if the business rule meets technical requirements. In these examples, the technically proficient user could be considered an experienced user, and the user with limited technical knowledge could be considered a novice user. Further, some systems may have a large number of business rules generated by a large number of users, each of whom generate only a small fraction of the total rules. The functionality of each rule will reflect the proficiency of its respective creator-manipulator.

A user interface can enable generation of a mapping 340 between elements of input and output datasets, such as a mapping between fields from an input record into fields in an output record. For example, when loading a feed of data into a data warehouse, the feed (the input) may have a hundred fields. The data in the feed will be used to populate fifty fields in the data warehouse (the output). The mapping 340 in this example provides the specification of how the input fields map to the output fields.

In some cases, individual input fields will map directly to individual output fields. Thus, many of the outputs will be computed by simply assigning them the value of a specific input field within the user interface. Other outputs can be calculated with expressions, constants, simple combinations of input fields (for example, a string concatenation), or more complex logic including if/then/else logic or function calls. Some outputs can be calculated using business rules. The user interface can provide appropriate editors, including the business rule editor 200.

In some implementations, the data management system 300 includes a user interface capable of allowing a user to perform simpler tasks while also receiving direct feedback within the user interface associated the more complicated tasks. For example the task of validation, as described in more detail below, can be incorporated via validation specifications prepared in advance by a more experienced user. A single user interface facilitating multiple related tasks allows a user to map elements of input datasets to elements of output datasets by manipulating or modifying transforms so that they provide the desired mapping. Further, a user can see at one location how manipulating the transforms affects the mapping between inputs and outputs. For example, using the user interface, a user can catch and fix errors so that the transforms will work as intended.

Test data may assist in evaluating whether a transform or set of transforms will work as intended. Test data can be provided using a set of prototypical inputs and expected outputs, for example.

In some examples, users have real data that they can use for generating test data. To handle cases where the users do not have real data to test with, the system can provide a data entry form for entering test data one record at a time, for example. The user can type in values for each of the fields in the input dataset and those records will be added to a test dataset.

The data management system 300 is able to provide syntax rules for the transforms. The syntax rules indicate the structure of transforms that will compile and/or execute properly. If a user operating the data management system modifies any of the transforms, the user's modifications should comply with the syntax rules. Further, the data management system 300 is able to provide validation rules for the outputs of the transforms. The validation rules indicate the types of outputs that are accepted as valid according to a desired format or other characteristics of the output dataset. If the user applies any of the transforms to real data or test data, the outputs of the transforms should comply with the validation rules. The validation rules and syntax rules can be provided as rule sets, as described above, or as other forms of executable logic that can be applied to the output of a transform.

In some examples, a user can access one or more transforms at a single user interface. This user interface provides the user with a view of some or all of the transforms associated with the mapping 340. Further, the single interface can also automatically apply the syntax rules and validation rules to transforms as well as test data as any of the transforms are modified or executed.

Thus, from the interface, a user can view how the mapping relates a collection of inputs to a collection of outputs, including how those inputs are evaluated and transformed.

Figure 5:
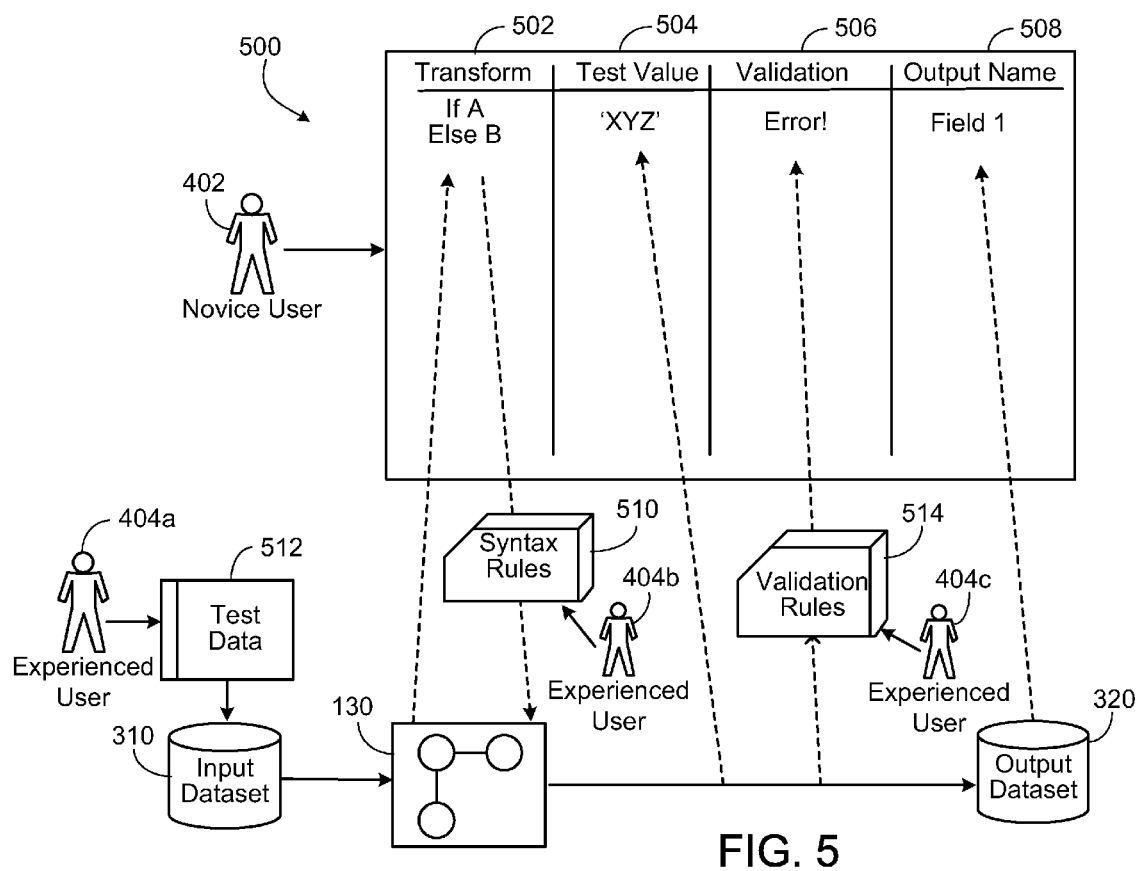
FIG. 5 is an example of a transform view interface and related elements.

FIG. 5 shows an example of a mapping view interface 500, which can be manipulated by a novice user 402 who does not necessarily have significant technical expertise. The mapping view interface 500 presents rows that each specify a mapped relationship between one or more inputs and a given output. The interface 500 includes a column for transforms 502 displayed in the form of transformational expressions that can be entered, viewed, and edited. The transformational expressions refer to input variables mapped to fields of an input dataset. In the case of an input being mapped directly to an output without any transformation, the transform column can simply identify the input without including any transformational expression. In some implementations, a transform 502 can map a constant value directly to an output, and the resulting output will have a value that does not change based on any input variables.

The transforms 502 can be executed automatically from the interface, as well as modified and re-executed using the modifications. The novice user 402 may not have the expertise to ensure the validity of the outputs of the transforms 502 that he generates or modifies, but the mapping view interface 500 provides additional information to the novice user 402 that incorporates expertise of more experienced users, and also provides additional safeguards to protect against potential errors by the novice user 402.

A transform can be implemented by a dataflow graph 130 including one or more components. The dataflow graph 130 contains executable code that performs the functionality of the transform. The mapping view interface 500 can extract the code and execute it directly.

As a novice user 402 modifies a transform 502, the mapping view interface 500 can apply syntax rules 510 to the modified transform to evaluate whether or not the modifications are acceptable. The syntax rules 510 specify valid structure for a transform. A transform that has been improperly structured may not be able to be executed properly. If a novice user 402 modifies a transform in a way that gives it an invalid structure, the transform view interface will identify the invalidity using the syntax rules and indicate the problem to the user. The syntax rules 510 can be defined by an experienced user 404b who has technical expertise directed to transform structure and execution, so that the novice user 402 will benefit from the experienced user's better understanding of transforms.

In use, there may be a small number of experienced users 404a, 404b, 404c, but a large number of novice users 402, all using an instance of the mapping view interface 500 to manipulate transforms operating on similar sets of data. The experienced users 404 a, 404b, 404c can define syntax rules and validation rules to be used by many potential novice users in many potential scenarios of operation. In this way, all of the many potential novice users have at hand the knowledge and expertise of the experienced users.

Referring still to FIG. 5, each transform 502 is associated with an output name 508. The output name 508 can be chosen to represent the "real-world" function of the transformed output, as opposed to a variable name or another identifier used by the data management system itself. The output name 508 corresponds to a field in the output dataset 320 that the transform 502 provides data to. For example, if the transform 502 processes data destined for a database of air travelers, then the output name 508 may represent a field in the database having to do with airlines, flights, passenger identity, or another real-world concept.

Each transform 502 can also be associated with a test value 504. The user can select test data 512 that the transform is executed upon, so that the test data is formatted for use as the input dataset 310 for the transform 502. The result of the transform executed on a given record (e.g., the initial record) in the test data 512 is shown as the test value 504. The test data 512 can be generated by the novice user 402 or by an experienced user 404 a, 404b, 404c who has the expertise to define various test scenarios, so that the novice user 402 can simply edit a transform 502 and view the result.

Each transform can also be associated with a validation 506. When a novice user 402 executes a transform using the test data 512, the mapping view interface 500 can apply validation rules 514 to determine if the resulting test value 504 is valid. The output of a transform 502 may have constraints with regard to its format or content (e.g., based on characteristics of the output dataset 320), and the validation rules 514 specify what format or content for an output is valid. For example, a transform might provide output in the form of numbers that should stay within a certain range, or the transform might provide output in the form of words that should be of a certain length, spelled correctly according to a dictionary, or have other characteristics. The validation rules 514 can specify that an output must be one of a predetermined set of possible values. The validation rules 514 can specify that an output should not correspond to a blank or null value, which may be caused by the transform connecting an input to that output producing a blank or null value, or may be caused by that output not being mapped to any input. The validation rules 514 can be applied to the mapped outputs collectively to ensure that constraints among different outputs are satisfied. For example, two outputs may have valid values individually, but their sum may not satisfy a given constraint, or the determination of whether one output value is valid may depend on the value of another output (e.g., valid values of a "parental leave" field may depend on whether a "gender" field has a value of male or female). In some implementations, a validation rule 514 may operate in conjunction with a secondary or external source of information. For example, a transform 502 can be used to convert data from a first format to a second format. The validation rule may reference a data structure such as a table that indicates valid values for data represented in the first format and also indicates valid values for data represented in the second format.

If the test value 504 falls outside the format or content constraints specified by the validation rules 514, then the validation 506 will indicate that there is a problem with the test value 504, and thus potentially a problem with the transform 502. An experienced user 404a, 404b, 404c can define the validation rules 514, drawing upon the experienced user's knowledge of how to analyze a given dataset and determine what constitutes valid data for that dataset. The experienced user can also draw upon technical programming and data management knowledge to codify those validity constraints into the validation rules 514 that can be stored as executable code and applied to the output of a transform. Thus, a novice user 402 operating the mapping view interface 500 does not necessarily need to carefully examine the test values 504 resulting from the test data 512, but rather can look to the validation 506 to see if there may be a problem that should be given further attention.

Figure 6:
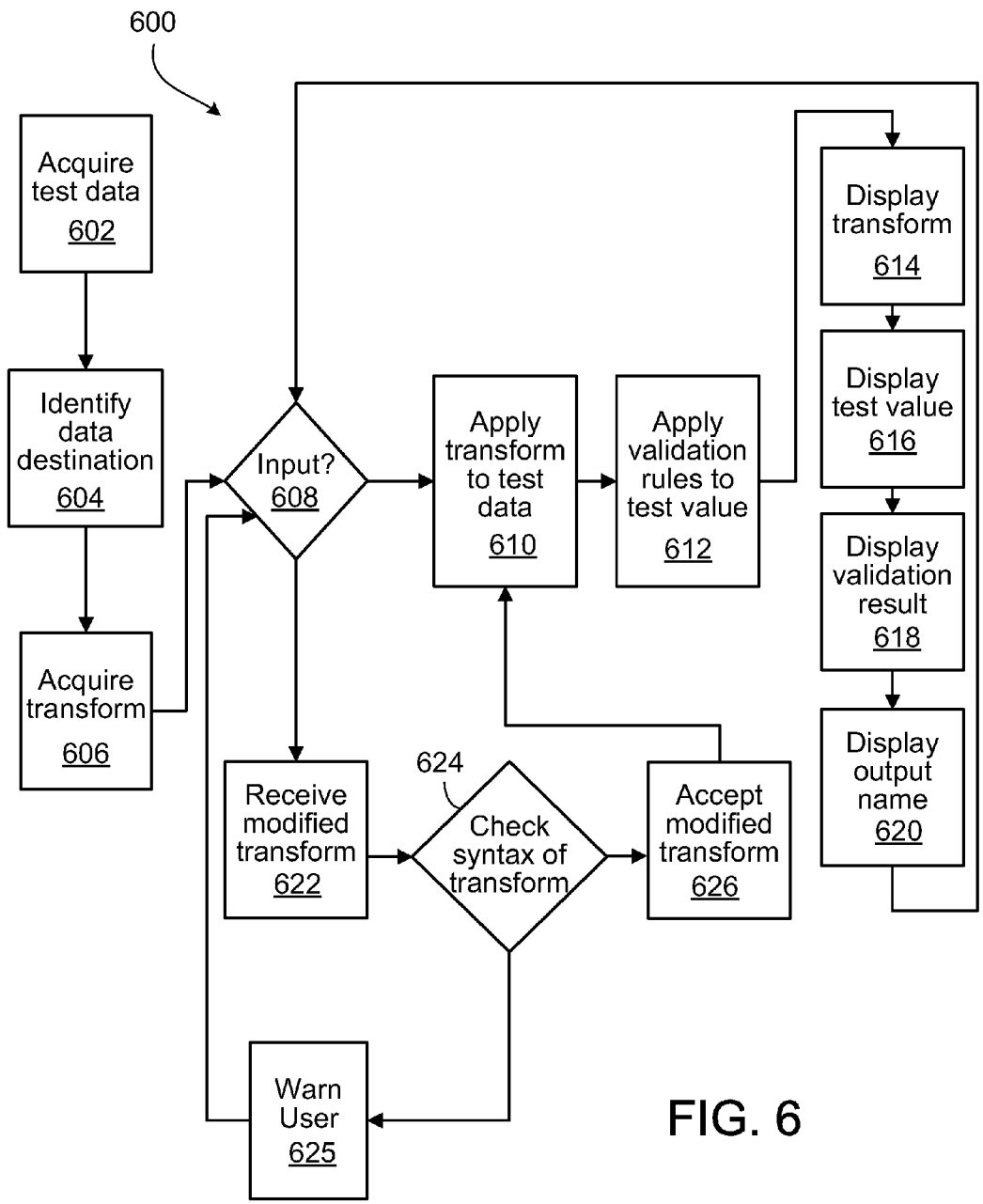
FIG. 6 is a flowchart showing a procedure for the operation of a transform view interface.

FIG. 6 shows a flow chart for an exemplary procedure 600 used by the system 300 to enable a user to view and manipulate mappings and their associated transforms using the mapping view interface 500. The procedure acquires 602 test data that includes one or more records that are to provide the input data values corresponding to elements (e.g., fields) of the input dataset that mapped to the input of a given transform. The procedure then identifies 604 a data destination (e.g., a field) corresponding to the element of the output dataset mapped to the output of the given transform. Next, the procedure acquires 606 the latest version of the mapping including the latest versions of the transforms. In a "record testing mode" the procedure applies the validation rules to a single test record of the input dataset. In a "dataset testing mode" the procedure applies the validation rules to multiple test records of the input dataset (in some cases, all the records in the input dataset).

The procedure determines 608 if the user has entered new input, which represents a modification to one or more of the transforms. If the user has not entered new input, the procedure applies 610 the current version of the transforms to the test data. The procedure then applies 612 the validation rules to the resulting test values received as output from the transforms. The procedure displays 614 the modified transforms, and also displays 616 the test values resulting from the modified transforms. Further, the procedure displays 618 validation information based on the result of applying the validation rules so that the user can evaluate whether or not the test values are valid. If the validation information is associated with a particular transform whose output does not satisfy the validation criteria, then the validation information can be visually associated with that transform (e.g., with an icon and/or explanatory text in the corresponding row of the validation column). In some cases, the validation information may be associated with invalid output of multiple transforms or invalid relationships among multiple transforms, in which case the validation information is not necessarily associated with any particular transform. The procedure also displays 620 the output names of the destinations used by the transforms. The procedure then returns to determining 608 if the user has entered any new input that modifies the transforms.

If the user has entered new input resulting in one or more modified transforms, then the procedure receives 622 the modified transforms from a transform compiler that recompiles the transforms based on the new input, and the procedure also checks 624 the syntax of the modified transforms. If the syntax is invalid according to the syntax rules, the procedure warns 625 the user so that the user can correct the syntax in the form of new input. If the syntax is valid, the procedure accepts 626 the modified transforms and continues with the steps described above starting with applying 610 the transforms to the test data. In the record testing mode, recompiling and applying the modified transforms to test record can occur nearly in real-time (e.g., less than a second) such that the user experiences live feedback based on the syntax and validation rules as the transforms are being edited. In the dataset testing mode, the recompiling and applying the modified transforms to the test records can be initiated in response to a user request.

FIGS. 7A-7H shows examples of various user interactions with the mapping view interface 500. The interface includes transformational expressions 702 (textual representations of transforms), test values 704, validations 712, and outputs 708.

Referring to FIG. 7A, a user modifies the transformational expression 702. If the modification produces a malformed transformational expression, the interface indicates the malformed transformational expression with an exclamation point 710 according to supplied syntax rules.

Referring to FIG. 7B, a test value 704 is provided in response to the user providing a modified transformational expression 702 that has corrected syntax.

Referring to FIG. 7C, a user enters a transformational expression 702 computing a value for an output 708 based on the input data transformed by the expression.

Referring to FIG. 7D, a user enters a transformational expression 702a computing a value for an output 708 based on one of several transformational expressions 702b, 702c.

Referring to FIG. 7E, a user enters a transformation expression 702a that depends on another transformational expression 702b to compute a value for its output 708.

Referring to FIG. 7F, a user modifies the transformational expression 702b upon which another transformational expression 702a depends. The output 708 of the first transformational expression updates accordingly.

Referring to FIG. 7G, a validation notice 712 indicates any problems with the output of the transformational expression 702, even if the transformational expression is syntactically correct.

Referring to FIG. 7H, a user views test data 708. A validation notice 712 indicates any problems with the application of the transformational expression 702 to the test data.

FIG. 8 shows an exemplary mapping view interface 800 representing an implementation of the mapping view interface 500 used for managing transformational expressions for computing values for a tax form. The mapping view interface 800 has many rows 802a, 802b, 802c, each including the name of an output field 804 (e.g., lines of a tax form in this example), the transformational expression 806 performed to compute the output value corresponding to the output field 804, and a test value in the form of a computed value 808 of the transformational expression 806 as applied to test data (e.g., test data 512 as shown in FIG. 5). If one of the computed values 808 triggers one of the validation rules (e.g., validation rules 514 as shown in FIG. 5), then the mapping view interface 800 displays a validation indicator 810 in proximity to the computed value to indicate that a validation rule has been triggered and the user can investigate the computed value to determine if it is invalid and/or if the associated transformational expression 806 needs to be modified. In some implementations, the validation indicator 810 indicates a difference between a computed value 808 and an expected value. For example, a transformational expression 806 may have been applied at a previous point in time, generating an output value. When the transformational expression 806 is applied to the same input data, the computed value 808 may be expected to be the same as the previously generated output value. In some implementations, if one of the computed value 808 triggers one of the syntax rules (e.g., syntax rules 510 as shown in FIG. 5), then the mapping view interface 800 displays a syntax error indicator (not shown).

The mapping view interface 500 can be used to view transformational expressions, output fields, and computed values at any of multiple points in a sequence of operations performed by one or more dataflow graphs. The mapping view interface 500 can generate a lineage diagram that can be used to display information about values in different fields of data that has been transformed according to one or more transformational expressions. Sometimes a database user may want to investigate how certain data are derived from different data sources. For example, a database user may want to know how a dataset or data object was generated or from which source a dataset or data object was imported. Tracing a dataset back to sources from which it is derived is called data lineage tracing (or "upstream data lineage tracing"). Sometimes a database user may want to investigate how certain datasets have been used (called "downstream data lineage tracing" or "impact analysis"), for example, which application has read a given dataset. A database user may also be interested in knowing how a dataset is related to other datasets. For example, a user may want to know if a dataset is modified, what tables will be affected.

Figure 9:
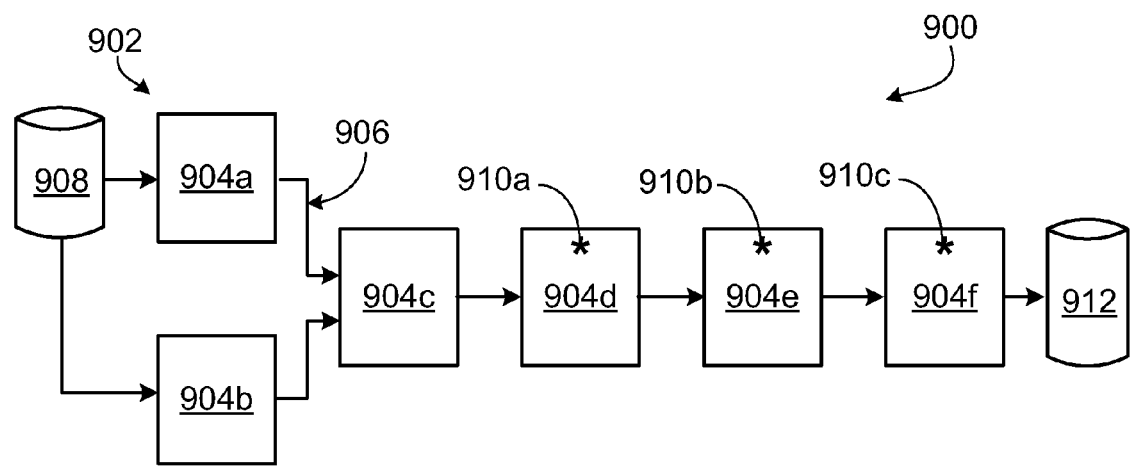
FIG. 9 is an example of a lineage diagram.

FIG. 9 shows a lineage diagram 900 representing including nodes 904a, 904b, 904c representing transformational expressions applied (e.g., by different components in a dataflow graph) and links 906 connecting the nodes representing upstream and downstream dependency relationships from an upstream input test dataset 908 to a downstream output dataset 912. Test data from input dataset 908 can be provided to nodes 904a, 904b that represent application of transformational expressions used to process the test data and the results are propagated to node 904c, which similarly applies a transformational expression as the test data continues to be transformed by nodes further in the sequence of nodes of the lineage diagram 900. A user can choose any one of the nodes and view the output fields and transformational expressions associated with that node, as well as the computed values of the output fields based on applying the transformational expressions to the data that has been processed by the transformational expression represented by the node according to the dependency relationships represented by the links 906.

The information needed to generate a lineage diagram can be stored as one or more dataflow graphs are processing the data in the input test dataset 908. Each node in the lineage diagram can be associated with computed values resulting from application of a transformational expression. In some cases, one or more of the nodes 904d, 904e, 904f are associated with computed values that trigger one or more of the validation rules associated with that node. In these cases, the lineage diagram 900 displays a validation indicator 910a, 910b, 910c on the nodes 904d, 904e, 904f for which validation rules have been triggered. The user can use the mapping view interface 500 to view the output fields, transformational expressions, and computed values of any of those nodes to determine if there is a problem, for example, the transformational expressions are producing invalid data. In some examples, the lineage diagram 900 also displays indicators for when one of the nodes has triggered a syntax rule (e.g., one of the syntax rules 510 of FIG. 5).

The user can also use the view of the lineage diagram 900 to determine if several nodes in sequence have triggered a validation rule and determine an initial source of a validation problem such as invalid data. In this example, all three nodes 904d, 904e, and 904f have triggered validation rules as indicated by the indicators 910a, 910b, 910c. The nodes 904d, 904e, and 904f and corresponding lineage relationships from node 904d to node 904e, and node 904e to node 904f can be examined for potential validation problems. It is possible that a transformational expression in node 904d has generated invalid data that then propagates to nodes 904e and 904f, also triggering similar validation rules in those nodes. Given this possibility, the user can first view the transformational expressions and computed values of the first node 904d to determine if that is the source of the problem for all three of the nodes.

Figure 10:
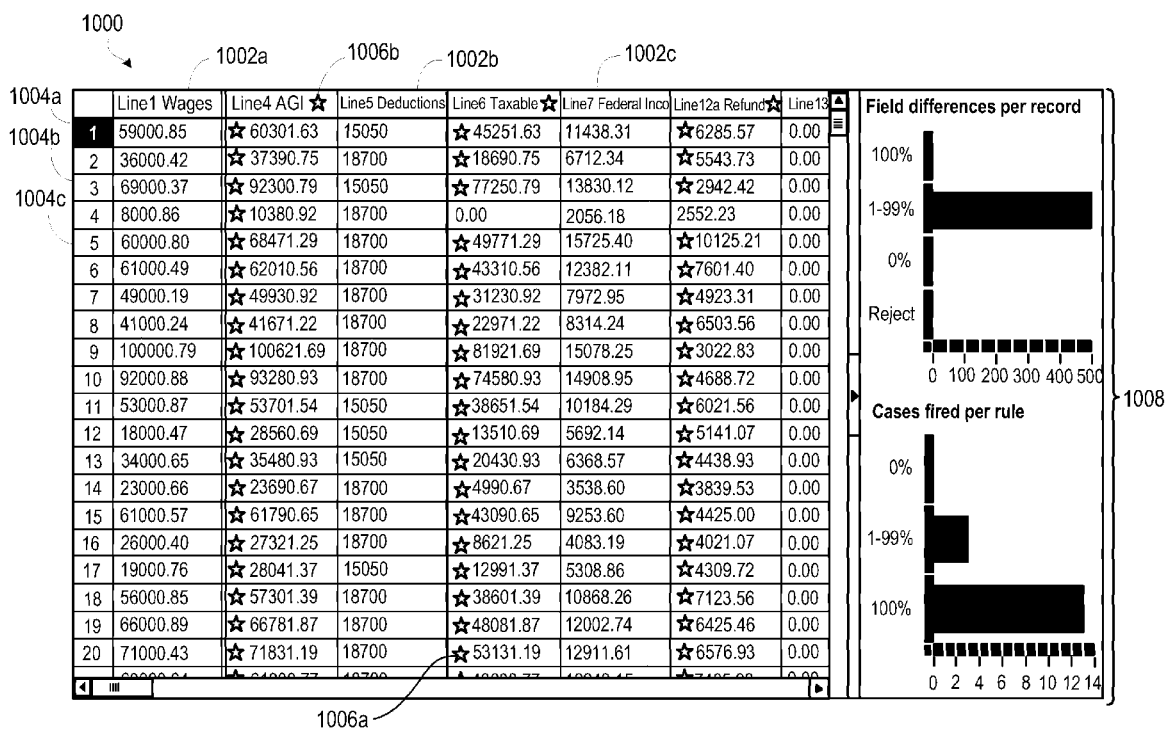
FIG. 10 is an example of a transform view interface.

FIG. 10 shows a test results interface 1000 that can be used to view many output fields and computed values at once. For example, the test results interface 1000 may be used to display results of applying the transformational expressions to the test data in dataset testing mode. The test results interface 1000 displays multiple output fields 1002a, 1002b, 1002c (in column headings) representing the application of their associated transformational expressions to multiple records 1004a, 1004b, 1004c of test data (as rows). A user can view the test results interface 1000 to see the effect of applying many transformational expressions upon many records of test data, including whether any of the test data triggers any validations rules. The test results interface 1000 can display validation indicators 1006a that indicate which pieces of data (computed values in particular records) have triggered a validation rule and may be invalid. The test results interface 1000 can also display validation indicators 1006b in the column (or row) headings to indicate to the user that at least one piece of data in the respective column (or row) has triggered a validation rule. This form of display can help a user seek out validation indicators 1006a for individual pieces of data when the view of the data as presented by the test results interface 1000 is very large. In some implementations, the test results interface 1000 also presents statistics 1008 about the presented data (e.g., in the form of a histogram), such as how much of the data has triggered a validation rule and how many different rules have been triggered. In some examples, the statistics 1008 are calculated at regular intervals, such as hourly or daily in response to different applications of the transformational expressions on the test data, and in other examples, the statistics are calculated in real time by applying the transformational expressions as the data is viewed. For example, an experienced user (for example, experienced user 404b of FIG. 5) might use the test results interface 1000 on a daily basis to see if any validation rules have been triggered by changes made by other users over the course of the day.

Figure 11:
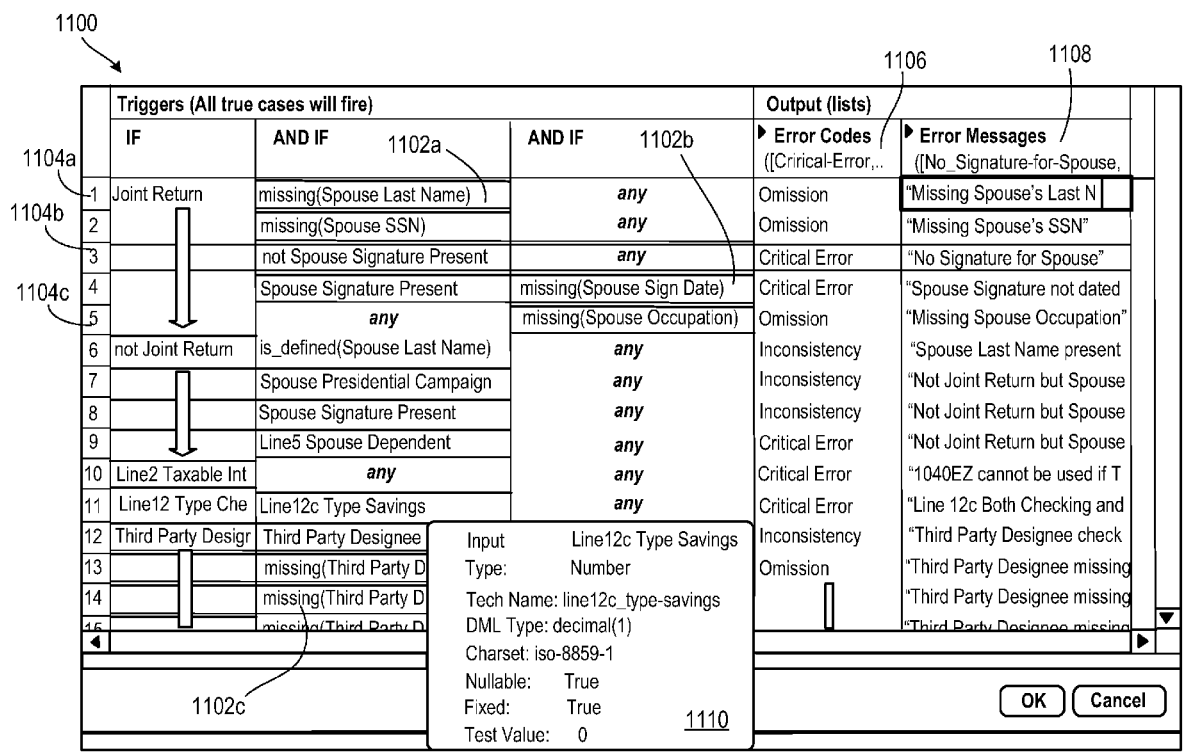
FIG. 11 is an example of a validation rule interface.

FIG. 11 shows a validation rules interface 1100, which allows a user to view and modify the trigger conditions 1102a, 1102b, 1102c of a set of validation rules 1104a, 1104b, 1104c. In some implementations, the validation rules also have an associated error code 1106 indicating the type of error that the validation rule represents, for example, an omission of essential information or an inconsistency between the information represented by an output field. In some implementations, the validation rules interface 1100 allows a user to access information 1110 about a given input used by any of the validation rules, so that the user does not need to access a different interface to obtain this information.

The validation rules can also have an associated custom error message 1108 displayed to a user when the user seeks further information about a particular instance of a validation rule triggering. For example, the user might click on a validation indicator (e.g., validation indicator 910a in FIG. 9) and a user interface would then display the appropriate custom error message 1108 for that validation rule, or a user interface might display a list of all custom error messages associated with validation rules triggered by a set of data. In some examples, an experienced user (for example, experienced user 404c of FIG. 5) defines the error messages to provide human-readable information to another user operating the user interface who may be unfamiliar with the validation rules.

The mapping approach described above can be implemented using software for execution on a computer. For instance, the software forms procedures in one or more computer programs that execute on one or more programmed or programmable computer systems (which may be of various architectures such as distributed, client/server, or grid) each including at least one processor, at least one data storage system (including volatile and non-volatile memory and/or storage elements), at least one input device or port, and at least one output device or port. The software may form one or more modules of a larger program, for example, that provides other services related to the design and configuration of dataflow graphs. The nodes (called "components") and links (called "data flows") of the graph can be implemented as data structures stored in a computer readable medium or other organized data conforming to a data model stored in a data repository.

The software may be provided on a storage medium, such as a CD-ROM, readable by a general or special purpose programmable computer or delivered (encoded in a propagated signal) over a communication medium of a network to the computer where it is executed. All of the functions may be performed on a special purpose computer, or using special-purpose hardware, such as coprocessors. The software may be implemented in a distributed manner in which different parts of the computation specified by the software are performed by different computers. Each such computer program is preferably stored on or downloaded to a storage media or device (e.g., solid state memory or media, or magnetic or optical media) readable by a general or special purpose programmable computer, for configuring and operating the computer when the storage media or device is read by the computer system to perform the procedures described herein. The inventive system may also be considered to be implemented as a computer-readable storage medium, configured with a computer program, where the storage medium so configured causes a computer system to operate in a specific and pre-defined manner to perform the functions described herein.

A number of embodiments of the invention have been described. Nevertheless, it will be understood that various modifications may be made without departing from the spirit and scope of the invention. For example, some of the steps described above may be order independent, and thus can be performed in an order different from that described.

It is to be understood that the foregoing description is intended to illustrate and not to limit the scope of the invention, which is defined by the scope of the appended claims. For example, a number of the function steps described above may be performed in a different order without substantially affecting overall processing. Other embodiments are within the scope of the following claims.

What is claimed is:

1. A method for presenting visual feedback in an interface, the method including:

receiving one or more mapped relationships between a given output and one or more inputs represented by input variables, at least one of the mapped relationships including a transformational expression executable on a data processing system, the transformational expression defining an output of a mapped relationship based on at least one input variable mapped to an element of an input dataset;

receiving identification of elements of an output dataset mapped to outputs of respective mapped relationships;

generating output data from the data processing system according to the transformational expression based on input data from the input dataset associated with the element of the input dataset mapped to the input variable;

determining validation information in response to the generated output data based on validation criteria defining one or more characteristics of valid values associated with one or more of the identified elements of the output dataset; and presenting in the interface visual feedback based on the determined validation information, the visual feedback including at least one indicator based on validation information for at least one transformed value associated with the one or more identified elements of the output dataset.

2. The method of claim 1, further including importing input data from the input dataset into the output dataset according to the mapped relationships.

3. The method of claim 2, wherein importing the input data includes applying the transformational expressions to input values in respective fields of input records of the input dataset and storing output values in respective fields of output records of the output dataset, where at least some fields of the input records correspond to the elements of the input dataset mapped to the input variables and at least some fields of the output records correspond to the elements of the output dataset mapped to outputs of respective mapped relationships.

4. The method of claim 3, wherein applying the transformational expressions to input values in respective fields of input records of the input dataset and storing output values in respective fields of output records of the output dataset includes executing a dataflow graph including nodes representing data processing components, links representing data flows between the data processing components, a node representing the input dataset providing a data flow of the input records, and a node representing the output dataset receiving a data flow of the output records.

5. The method of claim 1, further including storing a mapping specifying the mapped relationships.

6. The method of claim 1, wherein determining the validation information includes retrieving a stored specification of the validation criteria.

7. The method of claim 6, wherein the interface is provided by the data processing system and is presented to a first user, and the specification of the validation criteria is received from a second user.

8. The method of claim 1, further including presenting in the interface a value representing the generated output data.

9. The method of claim 1, wherein determining the validation information includes evaluating output data generated for each transforming mapped relationship that includes a transformational expression, based on the validation criteria associated with the identified elements of the output dataset mapped to the outputs of the transforming mapped relationships.

10. The method of claim 9, wherein the mapped relationships include multiple transforming mapped relationships that include transformational expressions.

11. The method of claim 9, wherein the validation criteria include a first validation criterion associated with a first identified element of the output data set that defines one or more characteristics of valid values associated with the first identified element, and a second validation criterion associated with a second identified element of the output data set that defines one or more characteristics of valid values associated with the second identified element.

12. The method of claim 11, wherein validation information is determined in response to a generated output record that includes a first field corresponding to the first identified element and a second field corresponding to the second identified element.

13. The method of claim 12, wherein the first validation criterion depends on a value in the second field of the output record.

14. The method of claim 12, wherein the validation information depends on a value in the first field of the output record and a value in the second field of the output record.

15. The method of claim 1, further including determining syntax information indicating valid structure for a transformational expression.

16. The method of claim 15, further including presenting in the interface visual feedback based on the determined syntax information.

17. The method of claim 1, further including accepting a modified transformational expression based on received user modifications to the transformational expression.

18. The method of claim 17, further including generating modified output data from the data processing system according to the modified transformational expression based on the input data from the input dataset.

19. The method of claim 18, further including determining modified validation information in response to the generated modified output data and presenting in the interface visual feedback based on the modified validation information.

20. The method of claim 19, wherein generating the modified output data and presenting the visual feedback based on the modified validation information occurs while the transformational expression is being modified.

21. The method of claim 19, wherein generating the modified output data and presenting the visual feedback based on the modified validation information occurs in response to a user request after the transformational expression has been modified.

22. The method of claim 1, wherein the input data from the input dataset is received according to a link representing a flow of data to a component of a dataflow graph that applies the transformational expression, the dataflow graph including nodes representing data processing components, links representing data flows between the data processing components, a node representing the input dataset providing a data flow of the input data, and a node representing the output dataset receiving a data flow of the output data.

23. The method of claim 1, wherein the generated output data stored in the output dataset is provided to the output dataset according to a link representing a flow of data from a component of a dataflow graph that applies the transformational expression, the dataflow graph including nodes representing data processing components, links representing data flows between the data processing components, a node representing the input dataset providing a data flow of the input data, and a node representing the output dataset receiving a data flow of the output data.

24. The method of claim 1, wherein at least a first mapped relationship is received in response to a selection of a component of a dataflow graph that applies the first mapped relationship, the dataflow graph including nodes representing data processing components, links representing data flows between the data processing components, a node representing the input dataset providing a data flow of the input data, and a node representing the output dataset receiving a data flow of the output records.

25. The method of claim 1, wherein the visual feedback includes an indicator representing validation information for one of a plurality of nodes of a lineage diagram displayed on the interface, the nodes representing transformed values that include at least one transformed value associated with the one or more identified elements of the output dataset.

26. The method of claim 25, wherein the visual feedback includes a plurality of indicators each associated with a node among the plurality of nodes of the lineage diagram displayed on the interface.

27. The method of claim 26, wherein at least some of the nodes associated with the indicators are connected by links representing dependencies between the transformed values represented by the nodes.

28. The method of claim 1, wherein the visual feedback includes a plurality of indicators each associated with an output element among a plurality of output elements displayed on the interface that include at least one output element representing the one or more identified elements of the output dataset.

29. The method of claim 28, wherein the plurality of output elements displayed on the interface correspond to fields representing results of application of transformational expressions to records of the input data.

30. The method of claim 29 wherein at least one indicator indicates validation information for a row of values for the fields, the row representing output values resulting from application of transformational expressions to a single record of the input data.

31. The method of claim 29 wherein at least one indicator indicates validation information for a column of values for a field, the column representing a plurality of applications of a single transformational expression to respective records of the input data.

32. The method of claim 1, wherein the visual feedback includes statistics computed based on the validation information, the statistics including data representing results of application of the validation criteria to multiple records of the input data.

33. The method of claim 32, wherein the statistics are calculated at regular time intervals.

34. The method of claim 1, wherein the visual feedback includes a custom error message associated with the validation criteria, the custom error message indicating information about a result of a particular instance of application of the validation criteria to a record of the input data.

35. The method of claim 1, further including receiving in the interface an output defined as at least one constant independent of the input variables.

36. The method of claim 1, further including receiving expected values representing results of transformational expressions, and wherein determining the validation information includes comparing the expected values to output data generated for each transforming mapped relationship that includes a transformational expression.

37. The method of claim 1 in which the validation criteria include a set of validation rules each defining one or more characteristics of valid values associated with one or more of the identified elements of an output dataset.

38. The method of claim 37 in which the validation rules indicate types of output data that are accepted as valid according to a desired format of an output dataset.

39. The method of claim 1 in which at least some of the validation criteria specify constraints on formatting of elements of an output dataset.

40. The method of claim 1 in which at least some of the validation criteria specify characteristics of valid values based on dependencies among multiple elements of an output dataset.

41. The method of claim 1 in which at least some of the validation criteria reference a data structure that indicates valid values for data represented in multiple formats, the multiple formats corresponding to respective formats of elements of an output dataset.

42. A system for presenting visual feedback in an interface, the system including:
an input data storage system storing an input dataset;
an output data storage system storing an output dataset; and
a data processing system configured to provide an interface for receiving user input and presenting results of data processing, including
receiving one or more mapped relationships between a given output and one or more inputs represented by input variables, at least one of the mapped relationships including a transformational expression executable on the data processing system, the transformational expression defining an output of a mapped relationship based on at least one input variable mapped to an element of the input dataset;
receiving identification of elements of the output dataset mapped to outputs of respective mapped relationships;
generating output data from the data processing system according to the transformational expression based on input data from the input dataset associated with the element of the input dataset mapped to the input variable;
determining validation information in response to the generated output data based on validation criteria defining one or more characteristics of valid values associated with one or more of the identified elements of the output dataset; and
presenting in the interface visual feedback based on the determined validation information, the visual feedback including at least one indicator based on validation information for at least one transformed value associated with the one or more identified elements of the output dataset.

43. The system of claim 42, further including importing input data from the input dataset into the output dataset according to the mapped relationships.

44. The system of claim 43, wherein importing the input data includes applying the transformational expressions to input values in respective fields of input records of the input dataset and storing output values in respective fields of output records of the output dataset, where at least some fields of the input records correspond to the elements of the input dataset mapped to the input variables and at least some fields of the output records correspond to the elements of the output dataset mapped to outputs of respective mapped relationships.

45. The system of claim 44, wherein the interface is provided by the data processing system and is presented to a first user, and the specification of the validation criteria is received from a second user.

46. The system of claim 42, further including presenting in the interface a value representing the generated output data.

47. The system of claim 42, wherein determining the validation information includes evaluating output data generated for each transforming mapped relationship that includes a transformational expression, based on the validation criteria associated with the identified elements of the output dataset mapped to the outputs of the transforming mapped relationships.

48. The system of claim 47, wherein the mapped relationships include multiple transforming mapped relationships that include transformational expressions.

49. The system of claim 48, wherein the validation criteria include a first validation criterion associated with a first identified element of the output data set that defines one or more characteristics of valid values associated with the first identified element, and a second validation criterion associated with a second identified element of the output data set that defines one or more characteristics of valid values associated with the second identified element.

50. The system of claim 42, further including determining syntax information indicating valid structure for a transformational expression, further including presenting in the interface visual feedback based on the determined syntax information.

51. The system of claim 42, further including accepting a modified transformational expression based on received user modifications to the transformational expression, further including generating modified output data from the data processing system according to the modified transformational expression based on the input data from the input dataset, further including determining modified validation information in response to the generated modified output data and presenting in the interface visual feedback based on the modified validation information.

52. The system of claim 42, wherein the input data from the input dataset is received according to a link representing a flow of data to a component of a dataflow graph that applies the transformational expression, the dataflow graph including nodes representing data processing components, links representing data flows between the data processing components, a node representing the input dataset providing a data flow of the input data, and a node representing the output dataset receiving a data flow of the output data.

53. The system of claim 42, wherein the generated output data stored in the output dataset is provided to the output dataset according to a link representing a flow of data from a component of a dataflow graph that applies the transformational expression, the dataflow graph including nodes representing data processing components, links representing data flows between the data processing components, a node representing the input dataset providing a data flow of the input data, and a node representing the output dataset receiving a data flow of the output data.

54. The system of claim 42, wherein at least a first mapped relationship is received in response to a selection of a component of a dataflow graph that applies the first mapped relationship, the dataflow graph including nodes representing data processing components, links representing data flows between the data processing components, a node representing the input dataset providing a data flow of the input data, and a node representing the output dataset receiving a data flow of the output records.

55. The system of claim 42, wherein the visual feedback includes an indicator representing validation information for one of a plurality of nodes of a lineage diagram displayed on the interface, the nodes representing transformed values that include at least one transformed value associated with the one or more identified elements of the output dataset.

56. The system of claim 55, wherein the visual feedback includes a plurality of indicators each associated with a node among the plurality of nodes of the lineage diagram displayed on the interface.

57. The system of claim 56, wherein at least some of the nodes associated with the indicators are connected by links representing dependencies between the transformed values represented by the nodes.

58. The system of claim 42, wherein the visual feedback includes a plurality of indicators each associated with an output element among a plurality of output elements displayed on the interface that include at least one output element representing the one or more identified elements of the output dataset.

59. The system of claim 58, wherein the plurality of output elements displayed on the interface correspond to fields representing results of application of transformational expressions to records of the input data.

60. The system of claim 59 wherein at least one indicator indicates validation information for a row of values for the fields, the row representing output values resulting from application of transformational expressions to a single record of the input data.

61. The system of claim 60 wherein at least one indicator indicates validation information for a column of values for a field, the column representing a plurality of applications of a single transformational expression to respective records of the input data.

62. The system of claim 42, wherein the visual feedback includes statistics computed based on the validation information, the statistics including data representing results of application of the validation criteria to multiple records of the input data.

63. The system of claim 62, wherein the statistics are calculated at regular time intervals.

64. The system of claim 42, wherein the visual feedback includes a custom error message associated with the validation criteria, the custom error message indicating information about a result of a particular instance of application of the validation criteria to a record of the input data.

65. The system of claim 42, further including receiving in the interface an output defined as at least one constant independent of the input variables.

66. The system of claim 42, further including receiving expected values representing results of transformational expressions, and wherein determining the validation information includes comparing the expected values to output data generated for each transforming mapped relationship that includes a transformational expression.

67. The system of claim 42, in which the validation criteria include a set of validation rules each defining one or more characteristics of valid values associated with one or more of the identified elements of an output dataset.

68. The system of claim 67 in which the validation rules indicate types of output data that are accepted as valid according to a desired format of an output dataset.

69. The system of claim 42, in which at least some of the validation criteria specify constraints on formatting of elements of an output dataset.

70. The system of claim 42, in which at least some of the validation criteria specify characteristics of valid values based on dependencies among multiple elements of an output dataset.

71. The system of claim 42, in which at least some of the validation criteria reference a data structure that indicates valid values for data represented in multiple formats, the multiple formats corresponding to respective formats of elements of an output dataset.

72. A system for presenting visual feedback in an interface, the system including:
    means for storing an input dataset;
    means for storing an output dataset; and
    means for providing an interface for receiving user input and presenting results of data processing, including
        receiving one or more mapped relationships between a given output and one or more inputs represented by input variables, at least one of the mapped relationships including a transformational expression executable on a data processing system, the transformational expression defining an output of a mapped relationship based on at least one input variable mapped to an element of the input dataset;
        receiving identification of elements of the output dataset mapped to outputs of respective mapped relationships;
        generating output data from the data processing system according to the transformational expression based on input data from the input dataset associated with the element of the input dataset mapped to the input variable;
        determining validation information in response to the generated output data based on validation criteria defining one or more characteristics of valid values associated with one or more of the identified elements of the output dataset; and
        presenting in the interface visual feedback based on the determined validation information, the visual feedback including at least one indicator based on validation information for at least one transformed value associated with the one or more identified elements of the output dataset.

73. A computer-readable storage device storing a computer program for presenting visual feedback in an interface, the computer program including instructions for causing a computer to:
    receive one or more mapped relationships between a given output and one or more inputs represented by input variables, at least one of the mapped relationships including a transformational expression executable on a data processing system, the transformational expression defining an output of a mapped relationship based on at least one input variable mapped to an element of an input dataset;

receive identification of elements of an output dataset mapped to outputs of respective mapped relationships;

generate output data from the data processing system according to the transformational expression based on input data from the input dataset associated with the element of the input dataset mapped to the input variable;

determine validation information in response to the generated output data based on validation criteria defining one or more characteristics of valid values associated with one or more of the identified elements of the output dataset; and present in the interface visual feedback based on the determined validation information, the visual feedback including at least one indicator based on validation information for at least one transformed value associated with the one or more identified elements of the output dataset.

74. The computer-readable medium of claim 73, further including importing input data from the input dataset into the output dataset according to the mapped relationships.

75. The computer-readable medium of claim 74, wherein importing the input data includes applying the transformational expressions to input values in respective fields of input records of the input dataset and storing output values in respective fields of output records of the output dataset, where at least some fields of the input records correspond to the elements of the input dataset mapped to the input variables and at least some fields of the output records correspond to the elements of the output dataset mapped to outputs of respective mapped relationships.

76. The computer-readable medium of claim 75, wherein the interface is provided by the data processing system and is presented to a first user, and the specification of the validation criteria is received from a second user.

77. The computer-readable medium of claim 73, further including presenting in the interface a value representing the generated output data.

78. The computer-readable medium of claim 73, wherein determining the validation information includes evaluating output data generated for each transforming mapped relationship that includes a transformational expression, based on the validation criteria associated with the identified elements of the output dataset mapped to the outputs of the transforming mapped relationships.

79. The computer-readable medium of claim 78, wherein the mapped relationships include multiple transforming mapped relationships that include transformational expressions.

80. The computer-readable medium of claim 78, wherein the validation criteria include a first validation criterion associated with a first identified element of the output data set that defines one or more characteristics of valid values associated with the first identified element, and a second validation criterion associated with a second identified element of the output data set that defines one or more characteristics of valid values associated with the second identified element.

81. The computer-readable medium of claim 73, further including determining syntax information indicating valid structure for a transformational expression, further including presenting in the interface visual feedback based on the determined syntax information.

82. The computer-readable medium of claim 81, further including accepting a modified transformational expression based on received user modifications to the transformational expression, further including generating modified output data from the data processing system according to the modified transformational expression based on the input data from the input dataset, further including determining modified validation information in response to the generated modified output data and presenting in the interface visual feedback based on the modified validation information.

83. The computer-readable medium of claim 73, wherein the input data from the input dataset is received according to a link representing a flow of data to a component of a dataflow graph that applies the transformational expression, the dataflow graph including nodes representing data processing components, links representing data flows between the data processing components, a node representing the input dataset providing a data flow of the input data, and a node representing the output dataset receiving a data flow of the output data.

84. The computer-readable medium of claim 73, wherein the generated output data stored in the output dataset is provided to the output dataset according to a link representing a flow of data from a component of a dataflow graph that applies the transformational expression, the dataflow graph including nodes representing data processing components, links representing data flows between the data processing components, a node representing the input dataset providing a data flow of the input data, and a node representing the output dataset receiving a data flow of the output data.

85. The computer-readable medium of claim 73, wherein at least a first mapped relationship is received in response to a selection of a component of a dataflow graph that applies the first mapped relationship, the dataflow graph including nodes representing data processing components, links representing data flows between the data processing components, a node representing the input dataset providing a data flow of the input data, and a node representing the output dataset receiving a data flow of the output records.

86. The computer-readable medium of claim 73, wherein the visual feedback includes an indicator representing validation information for one of a plurality of nodes of a lineage diagram displayed on the interface, the nodes representing transformed values that include at least one transformed value associated with the one or more identified elements of the output dataset.

87. The computer-readable medium of claim 86, wherein the visual feedback includes a plurality of indicators each associated with a node among the plurality of nodes of the lineage diagram displayed on the interface.

88. The computer-readable medium of claim 87, wherein at least some of the nodes associated with the indicators are connected by links representing dependencies between the transformed values represented by the nodes.

89. The computer-readable medium of claim 73, wherein the visual feedback includes a plurality of indicators each associated with an output element among a plurality of output elements displayed on the interface that include at least one output element representing the one or more identified elements of the output dataset.

90. The computer-readable medium of claim 89, wherein the plurality of output elements displayed on the interface correspond to fields representing results of application of transformational expressions to records of the input data.

91. The computer-readable medium of claim 90 wherein at least one indicator indicates validation information for a row of values for the fields, the row representing output values resulting from application of transformational expressions to a single record of the input data.

92. The computer-readable medium of claim 91 wherein at least one indicator indicates validation information for a column of values for a field, the column representing a plurality of applications of a single transformational expression to respective records of the input data.

93. The computer-readable medium of claim 73, wherein the visual feedback includes statistics computed based on the validation information, the statistics including data representing results of application of the validation criteria to multiple records of the input data.

94. The computer-readable medium of claim 93, wherein the statistics are calculated at regular time intervals.

95. The computer-readable medium of claim 73, wherein the visual feedback includes a custom error message associated with the validation criteria, the custom error message indicating information about a result of a particular instance of application of the validation criteria to a record of the input data.

96. The computer-readable medium of claim 73, further including receiving in the interface an output defined as at least one constant independent of the input variables.

97. The computer-readable medium of claim 73, further including receiving expected values representing results of transformational expressions, and wherein determining the validation information includes comparing the expected values to output data generated for each transforming mapped relationship that includes a transformational expression.

98. The computer-readable medium of claim 73, in which the validation criteria include a set of validation rules each defining one or more characteristics of valid values associated with one or more of the identified elements of an output dataset.

99. The computer-readable medium of claim 98 in which the validation rules indicate types of output data that are accepted as valid according to a desired format of an output dataset.

100. The computer-readable medium of claim 73, in which at least some of the validation criteria specify constraints on formatting of elements of an output dataset.

101. The computer-readable medium of claim 73, in which at least some of the validation criteria specify characteristics of valid values based on dependencies among multiple elements of an output dataset.

102. The computer-readable medium of claim 73, in which at least some of the validation criteria reference a data structure that indicates valid values for data represented in multiple formats, the multiple formats corresponding to respective formats of elements of an output dataset.

* * * * *